Feb. 5, 1957  M. B. NONHOF  2,780,392
HUMIDIFYING DEVICES FOR COOKING PURPOSES
Filed July 25, 1955  2 Sheets-Sheet 1

Melvin B. Nonhof
INVENTOR.

BY *[signatures]*
Attorneys

Feb. 5, 1957     M. B. NONHOF     2,780,392
HUMIDIFYING DEVICES FOR COOKING PURPOSES

Filed July 25, 1955     2 Sheets-Sheet 2

Melvin B. Nonhof
INVENTOR.

BY *Clarence A. O'Brien*
*and Harvey B. Jacobson*
Attorneys

United States Patent Office 2,780,392
Patented Feb. 5, 1957

2,780,392

HUMIDIFYING DEVICES FOR COOKING PURPOSES

Melvin B. Nonhof, Bancroft, S. Dak.

Application July 25, 1955, Serial No. 524,046

1 Claim. (Cl. 222—185)

My invention relates to improvements in humidifying devices for cooking utensils.

The primary object of my invention is to provide a humidifying device for use in cooking utensils to supply moisture at the bottom of the utensil to food being cooked by the so-called waterless cooking process.

Another object is to provide a device for the above purpose which is equipped with valve controlled moisture discharge means whereby the device may be preset to supply moisture as desired to prevent different quantities of food in the utensil from being burned or dehydrated.

Still another object is to provide a device for the above purposes which is easy to handle and maintain clean and is simple in construction and inexpensive to manufacture and use.

Other ancillary objects together with the precise nature of my improvements and the advantages thereof will become apparent when the following description and claim are read with reference to the accompanying drawings in which:

Figure 1:
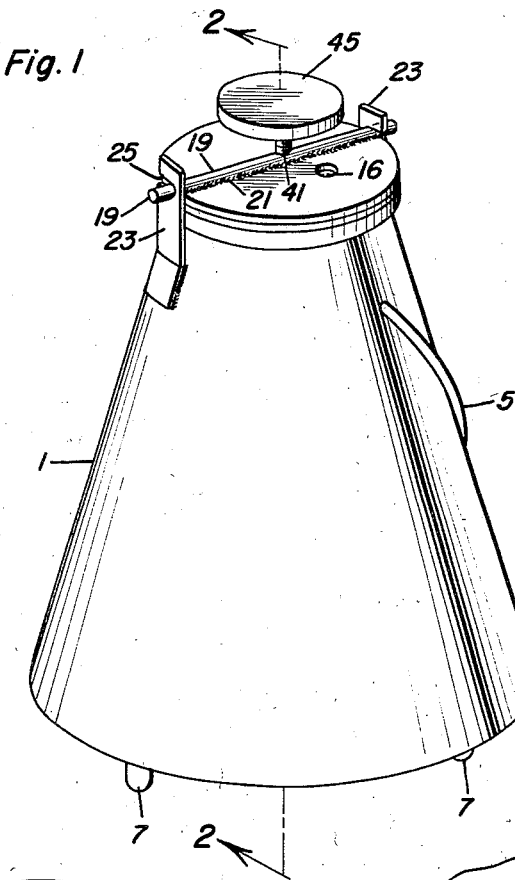
Figure 1 is a view in perspective of my improved humidifying device in a preferred embodiment thereof.
Figure 3:
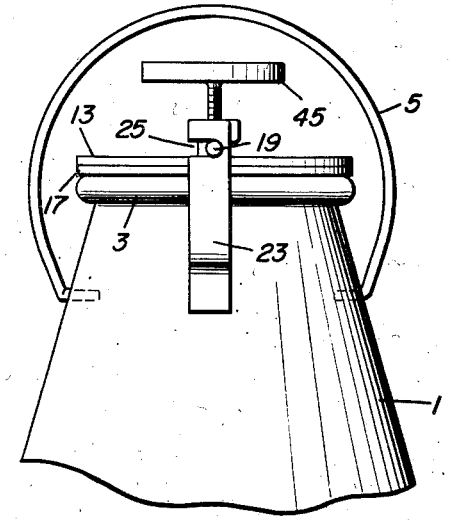
Figure 3 is a fragmentary enlarged view in side elevation.
Figure 4:
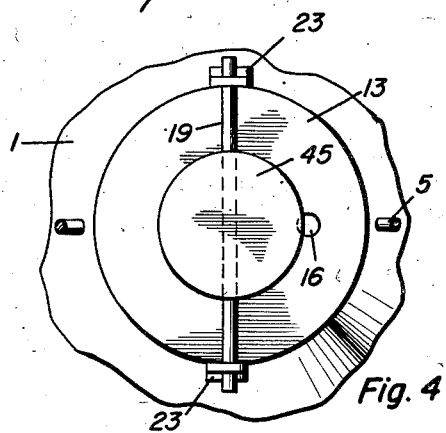
Figure 4 is an enlarged fragmentary view in plan partly in section.
Figure 2:
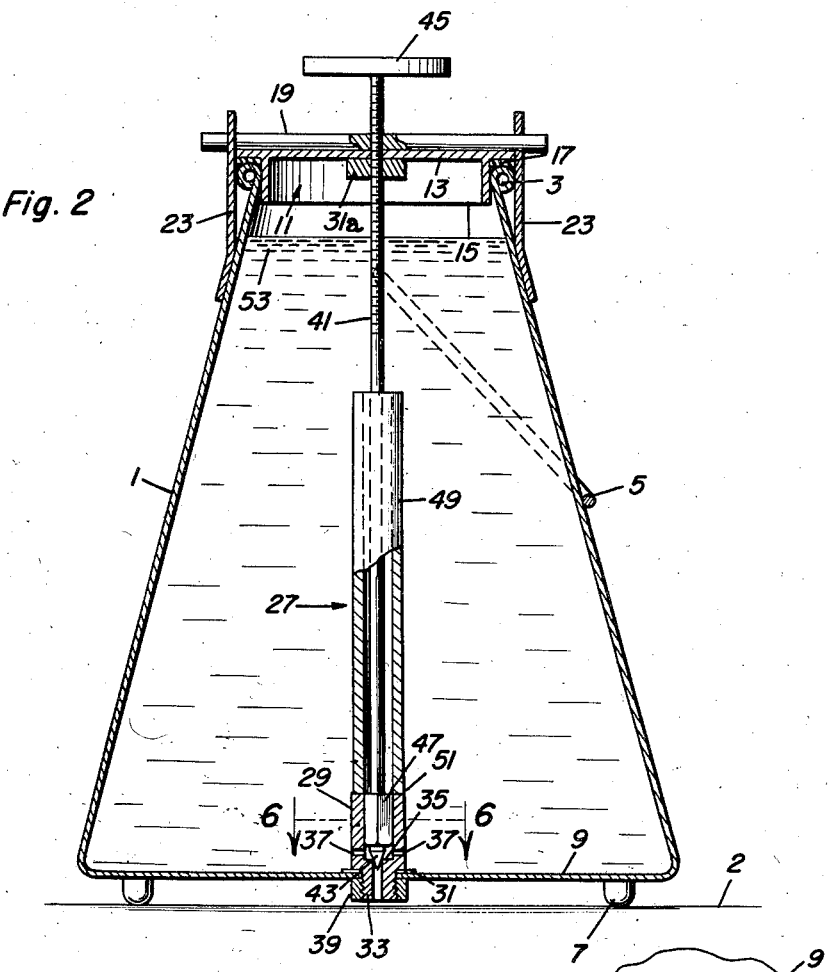
Figure 2 is an enlarged view in vertical section partly in side elevation taken on the line 2—2 of Figure 1.
Figure 6:
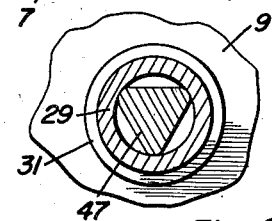
Figure 6 is an enlarged fragmentary view in horizontal section taken on the line 6—6 of Figure 2.
Figure 5:
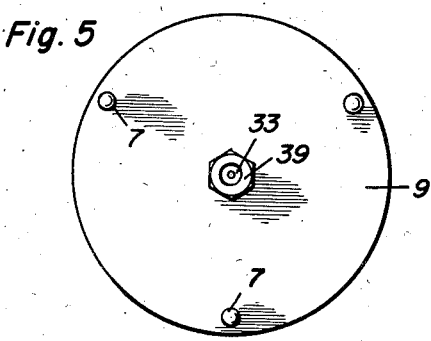
Figure 5 is a view in bottom plan drawn to a smaller scale.

Referring to the drawings by numerals, as shown therein, the humidifying device of my invention comprises a metal water container 1 of a suitable size for seating in the bottom 2 of a cooking utensil, not shown, in the approximate center of the utensil in spaced relation to the side thereof and to be covered by a lid of a cooking utensil. Preferably, the container 1 is frusto-conical to be held down in the utensil by food therein and is provided with a rolled rim 3 and a pivoted handle bail 5 of conventional type for manipulating and carrying the same. Short circumferentially spaced feet 7 on the bottom 9 of the container 1 are provided to space said bottom 9 above the bottom 2 for a particular purpose presently seen.

A closure 11 for the container 1 is provided comprising a metal closure disk 13 overlying the rim 3 and provided with an annular bottom flange 15 fitting in said rim. A sealing gasket 17 on the closure disk 13 and surrounding the flange 15 seats on the rim 3. An air vent 16 is provided in said disk 13.

Means is provided for locking the closure 11 down tight on the rim 3 to compress the gasket 17 and form a water-tight seal between the closure disk 13 and rim 3. This means comprises a diametrical bar 19 welded, as at 21, on top of the closure disk 13 and a pair of diametrically opposite upstanding keeper bars 23 on the container 1 having oppositely opening horizontal slots 25 therein in which the ends of the bar 19 may be engaged by a slight turning of said closure 11 in one direction after said closure 11 has been applied in closing position. As will be obvious, by rotation of the closure in the opposite direction, the ends of the bar 19 may be rotated out of the slots 25 so that said closure 11 may be detached to open the container 1.

The valve controlled moisture discharge means comprises a valve assembly in the axis of the container and designated generally by the numeral 27. The assembly 27 comprises an axial discharge nipple 29 seated on a sealing washer 31 on the bottom 9 of the container 1, said nipple having a reduced axially ported bottom discharge neck 33 depending through said bottom, a valve seat 35 at the inner end of said neck 33 and a pair of radial inlet ports 37 therein above said seat 35. A lock nut 39 threaded on the neck 35 against said bottom 9 secures the nipple 29 in place.

A valve stem 41 depends axially through the closure disk 13 and through the bar 19 into the nipple 29 with a lower end needle valve terminal 43 and is threaded through said disk 13, bar 19 and a nut 31a on the bottom of said disk for screw feed through the closure toward and from the seat 35 to vary the amount of moisture discharging out of the nipple 33. A hand wheel 45 on the upper end of said stem 41 above the closure 11 provides for manual screw feed of said stem 41. A polygonal pilot boss 47 on the stem 41 above the needle valve terminal 43 slides and rotates in said nipple 29 to center the needle valve terminal 43 relative to said seat 35.

Obviously, when the closure 11 is detached and applied, the stem 41 and boss 47 must be removed out of the nipple 29 and inserted therein. To facilitate such removal and insertion of the stem 41 and boss 47, a tubular guide 49 is welded, as at 51, on top of the nipple 29 and rises concentrically thereof and through which said boss 47 is slidable to guide the stem 41 during removal and insertion thereof.

In the operation of the invention, the closure 11 is detached to open the container 1, and the valve stem 41 and boss 47 thereby removed. The container 1 is filled approximately with water 53 and the closure 11 applied thereby inserting the valve stem 41 and boss 47 in the nipple 29. The closure 11 is then rotated to lock the same down in the manner already described. The valve stem 41 is then screw fed to preset the needle valve terminal 43 relative to the seat 35 for discharge of the water out of the neck 33 as desired according to the amount of moisture desired in cooking different foods. The container is then set in a cooking utensil on the bottom thereof so that the moisture is discharged into the bottom of the utensil. The feet 7 space the discharge neck 33 slightly above the bottom 2 of the utensil for free discharge of moisture out of said neck. The vent 16 provides for escape of steam from the container if the water therein should boil and also for admission of air to facilitate discharge from the nipple 29.

It will be noted that the pilot boss 47 being polygonal will permit water to pass the same in the tubular guide 49 so that water in the container 1 may recirculate therein through said guide under the action of heat in the container if the needle valve terminal 43 is seated, and whereby the water will circulate to advantage through the food being cooked.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A humidifying device for supplying moisture to food in a cooking utensil comprising a water container open at its top, and having a closed bottom, a ported water discharge nipple in the bottom of the container threaded therethrough and rising therefrom into the container with ports therein above said bottom for discharging water below said bottom, feet on said bottom for supporting the container on the bottom of a utensil with the nipple spaced from the bottom of said utensil, a valve seat in said nipple, a closure for the top of the container, a valve stem threaded through said closure with a terminal needle valve end in said nipple for screw feed through said closure to adjust said valve end toward and from the seat for controlling discharge of water from said nipple, a pilot boss on said stem rotatably fitted in said nipple for centering said valve end relative to said seat and being spaced above said ports to clear the same, said closure being adapted to be removed and applied and said stem and boss being removable from said nipple and insertable therein when the closure is removed and applied, and a tubular guide rising from said nipple and through which said boss is slidable in removing and inserting said stem and boss, said boss being polygonal to permit water to circulate through said tube when said needle valve end is seated.

References Cited in the file of this patent

UNITED STATES PATENTS

| 93,918 | Snyder et al. | Aug. 17, 1869 |
| 1,064,150 | McDaniel et al. | June 10, 1913 |
| 1,558,597 | Eckard | Oct. 27, 1925 |
| 2,313,382 | Kistner | Mar. 9, 1943 |
| 2,583,335 | Jepson | Jan. 22, 1952 |
| 2,645,383 | Miller | July 14, 1953 |